Patented Oct. 17, 1922.

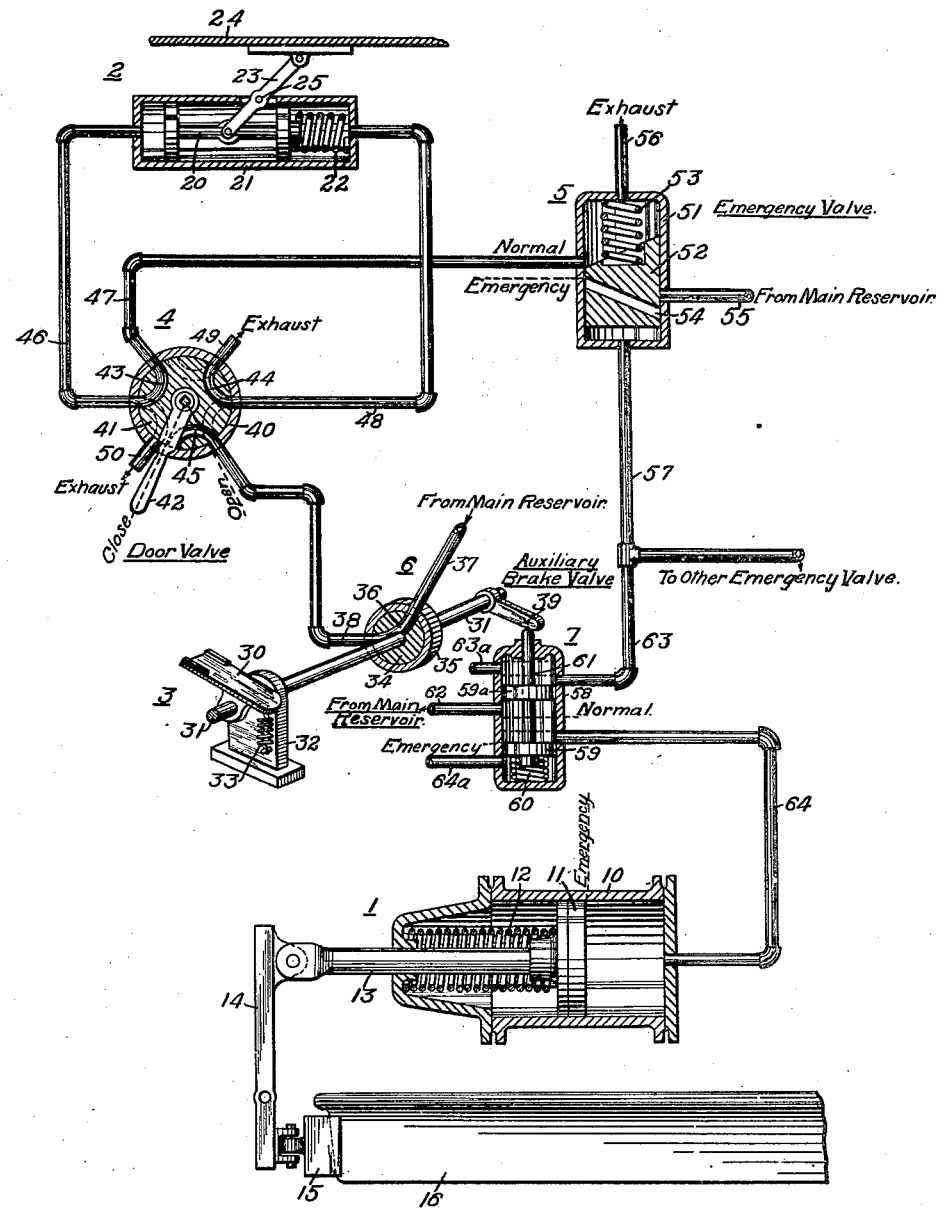

1,431,986

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed July 19, 1920. Serial No. 397,379.

*To all whom it may concern:*

Be it known that I, KARL A. SIMMON, a citizen of the United States, and a resident of Edgewood Park, in the county of Allegheny and State of Pennsylvania, have invented a new and useful Improvement in Systems of Control, of which the following is a specification.

My invention relates to systems of control for electric railway vehicles and the like and it has special relation to certain interlocking features in connection with door and brake operation for "one-man" or "safety" cars.

One object of my invention is to provide, in conjunction with a manually-governed fluid-pressure-operated door-engine, an arrangement of apparatus whereby the door engine cannot be moved to its "open" position unless the brake apparatus is in a certain condition, namely, service or emergency application.

Another object of my invention is to provide an interlocking feature of the above-indicated character in conjunction with "foot-control" of the electric circuits for safety-car operation.

A further object of my invention is to provide an auxiliary device for effecting unlocking or opening of pneumatically-operated and manually-controlled doors and for retaining such unlocking conditions as long as fluid pressure is available in the brake cylinder.

My invention may best be understood by reference to the accompanying drawing, wherein the single figure is a semi-diagrammatic view of a system of pneumatic control organized in accordance with my present invention.

Referring to the drawing, the system here shown comprises a pneumatic brake apparatus 1 of a familiar type; a door-engine 2 of a well-known pneumatically-operated construction; and a foot-operated control device 3 for primarily governing the safety-car operation. A manually-operated valve 4 is provided for the door-engine 2; and an emergency valve 5, that is pneumatically associated with the braking apparatus 1, and a rotary valve 6, that is mechanically associated with the foot-operated device 3, act in conjunction with the manually-operated valve 4 under emergency conditions, as hereinafter set forth in detail.

A second auxiliary or brake valve 7, which is actuated through the agency of the foot-operated device 3, is employed for rendering the braking apparatus 1 active under such emergency conditions.

All of the pieces of apparatus are illustrated in their emergency positions, which positions are assumed whenever the operator, for any reason, removes his foot from the foot-operated device 3.

The fluid-pressure braking apparatus 1 may comprise a suitable operating cylinder 10 within which a piston 11 is adapted to travel, being biased to the released position by means of a helical spring 12. The piston rod or stem 13 is pivotally joined to a brake rod 14, one end of which is, in turn, associated with a brake-shoe 15 for application to a wheel 16 of the vehicle.

The door-engine 2 may comprise a double-piston member 20 which travels within a suitable operating cylinder 21 and which may, if desired, be biased to the illustrated "door open" position by means of a helical spring 22. However, this spring is not essential to the operation of my system, but should be provided in case it is desired to automatically effect opening of the vehicle door under emergency braking conditions. If unlocking or unlatching of the door is all that is required, so that the passengers may manually force the door open, then the spring 22 may be omitted.

An oscillating lever 23 has one end pivotally attached to the duplex-piston member 20, the other end being similarly fastened to a vehicle door 24. The lever 23 may be conveniently mounted intermediate its ends upon the cylinder 21, as indicated by the reference character 25.

Consequently, admission of fluid pressure to the one or to the other end of the cylinder 21 effects movement of the piston member 20 toward the "open" or the "closed" position, and the car door 24 is correspondingly moved. It will be understood, however, that any other suitable pneumatic-type door engine may be employed in lieu of the simple form illustrated.

The foot-operated device 3 is shown as comprising a pedal or foot-lever 30, which is operatively secured to a rotatable shaft or rod 31 that is mounted in a suitable bracket or standard 32. A spring 33 is attached to the heel portion of the pedal 30 to bias it to the illustrated emergency position whenever the motorman, through illness or distraction, or for any other reason, removes his foot from the pedal. The pedal 30 is preferably adapted for controlling apparatus other than that herein illustrated, whereby both the electric circuits and the pneumatic braking apparatus may be governed by the single foot-operated device. Such combined control is illustrated, for example, in Patent No. 1,332,803, granted March 2, 1920, to John S. McWhirter. Inasmuch as such control of electric circuits is not essential to an understanding of the operation of my present invention, I have not deemed it necessary to illustrate such control here.

The rotary element or disk 34 of the valve 6 is attached to an intermediate point of the foot-operated rod or shaft 31 to rotate within a suitable encasing member or shell 35. In the illustrated emergency position, a passage 36 in the rotary element 34 serves to effect communication between an inlet pipe 37, which is directly connected to the main reservoir, and a delivery pipe 38, which is connected to the manually-operated door valve 4.

An arm or projection 39, which is rigidly secured to the foot-operated shaft 31, is adapted to actuate the auxiliary valve 7 under the emergency conditions in question, as hereinafter more fully described.

The manual control valve 4 for the door-engine 2 comprises a suitable stationary cylinder or encasing member 40 for enclosing a rotatable element or disk 41 to which is secured a suitable operating handle 42. As indicated by the legends "Close" and "Open," the handle 42 is adapted to assume two operative positions for changing the location of a plurality of passages 43, 44 and 45, whereby the door-engine 2 may be actuated in the one or the other direction. The passage 43, when the valve 4 occupies its illustrated "closed" position, is adapted to join a pipe 46 leading to the corresponding end of door-engine cylinder 21 and a pipe 47 which leads to the auxiliary emergency valve 5. The passage 44 in the illustrated position serves to effect communication between a pipe 48 leading to the opposite end of the door-engine cylinder 21 and an exhaust pipe or passage 49. One end of the passage 45 registers with the pipe 38 leading to the foot-operated valve 6, but the other end of the passage is blanked off, whereby fluid pressure cannot be transmitted through the passage 45 except when the manual valve 4 occupies its "open" position.

Another exhaust pipe or passage 50 is provided for effecting communication through the passage 43 with the pipe 46 when the valve 4 is actuated to its open position. In this way, the pressure present in the closing end of the cylinder 21 may be exhausted to the atmosphere, as indicated by the corresponding dotted line in the valve. The remaining dotted lines illustrate the location of the passages 44 and 45 when the valve 4 occupies its "open" position. Under this condition, the pipe 38 is connected to the opening pipe 48 for the door-engine while the passage 44 has one end blanked off.

The emergency valve 5 comprises an encasing member or shell 51 within which the block or movable piston member 52 is adapted to travel, being biased toward the illustrated emergency position by means of a helical spring 53. A passage 54 is blanked off at both ends in the illustrated position, but, under normal operating conditions, is adapted to join a pipe 55 that is connected to the main reservoir with the pipe 47 leading into the manual valve 4. Under the emergency conditions in question, however, the movable block 52 is held in such position as to effect communication between the pipe 47 and an exhaust pipe or passage 56, which is located at one end of the encasing member 51. An inlet pipe 57 is connected to the other end of the encasing member and to the auxiliary valve 7, as subsequently more fully set forth.

The auxiliary valve 7 comprises an encasing member or cylinder 58 within which is adapted to travel a duplex piston having disks 59 and 59a, which is biased to the dotted-line position marked "normal" by means of a helical spring 60. However, in the illustrated emergency position, the piston rod or stem 61 is engaged by the arm 39 of the foot-operated shaft 31, whereby the piston disk 59a is depressed to a position above a main reservoir supply pipe 62 and below an exhaust pipe 63a and a delivery pipe 63. The pipe 63 directly communicates with the above-mentioned pipe 57 leading into the emergency valve 5. The other piston disk 59, under emergency conditions, occupies a position below both the supply pipe 62 and the brake pipe 64. In the "normal" position of the auxiliary valve 7, it will be noted that communication between the supply pipe 62 and the delivery pipe 63 is permitted beneath the piston 59a, but communication between delivery pipe 63 and exhaust pipe 63a is prevented by the piston disk 59a. Furthermore, the brake pipe 64 communicates, beneath the other piston ring 59, with an exhaust pipe 64a for releasing air from the brake cylinder 10. During "normal" conditions, therefore, full reservoir pressure is admitted to the encasing member 51 of the emergency valve 5 to actuate the sliding block 52 into its normal position, wherein communication is established between the supply pipe 55 and the pipe 47.

Under normal operating conditions, fluid pressure is exhausted from the brake cylinder 10 through the agency of the pipes 64 and 64ª, as mentioned above, whereby the brake-shoe 15 is withdrawn from its emergency application to the car wheel 16. Furthermore, if the handle 42 of the door valve 4 occupies its illustrated closed position, fluid pressure is admitted through the emergency valve 5, as previously described, to the pipe 47, and thence through passage 43 and pipe 46 to the closing end of the door-engine cylinder 21.

All of these actions presuppose the operation of the foot-controlled device 3 to some position other than the illustrated emergency position, which operation is accomplished by depression of the pedal 30 by the foot of the operator in opposition to the action of the spring 33. Such movement of the pedal 30 effects disengagement of the arm 39 of the foot-operated shaft 31 from the piston rod 61 of the valve 7, whereby the spring 60 actuates the pistons 59 and 59a to the upper position designated as "normal." In this way, the previously-described admission of fluid pressure to the emergency valve 5 is automatically effected to close the door when the vehicle operator starts the vehicle into operation.

At the same time, the passage 36 in the rotary element 34 of the foot-operated valve 6 is placed in a position cutting off communication between the pipes 37 and 38. Consequently, although the vehicle doors may be closed, as set forth above, even though the foot-operated valve 6 does not occupy the illustrated position, on the other hand the opening of the doors cannot be effected, except by manual operation of the door valve 4 to its "open" position, unless the foot-operated device 3 does occupy its illustrated emergency position. This will be come evident from the fact that, even though the operating handle 42 for the door valve 4 is actuated to the "open" position, no fluid pressure is admitted to the pipe 48, since communication between the supply pipe 37 and the delivery pipe 38 is prevented by reason of the position of the passage 36 in the foot-operated valve 6.

However, as soon as the foot-operated device 3 assumes its illustrated emergency position, fluid pressure is admitted from the supply pipe 37 through passage 36, pipe 38, passage 45 of the door valve 4 in its "open" position and pipe 48 to the door-engine cylinder 21 whereby the desired door-opening movement may be manually effected.

If the spring 22 in the door-engine cylinder 21 is provided, such opening of the vehicle door 24 will occur automatically under the emergency conditions in question. On the other hand, if the spring 22 is omitted, the door-engine will be pneumatically unlocked so that the vehicle passengers may readily effect the opening of the door. This result follows from the fact that, when the piston rod 61 of the auxiliary valve 7 is depressed by the arm 39 of the foot-operated shaft 31, the fluid pressure in the pipe line 57 is exhausted through pipes 63 and 63a, so that the spring 53 in the emergency valve 5 actuates the sliding block or piston 52 to the illustrated emergency position. Consequently, the closing end of the door-engine cylinder 21 is connected with the atmosphere by means of the pipe 46, passage 43 of the door valve 4 in its closed position, pipe 47 and encasing member 51 of the emergency valve to the exhaust pipe or passage 56. At the same time, the opening end of the door-engine cylinder 21 is connected to the atmosphere through pipe 48, passage 44 of the door valve 4 and pipe or passage 49.

Furthermore, as soon as the foot-operated device 3 occupies its illustrated emergency position to depress the pistons 59 and 59a of the auxiliary valve 7, pressure from the main reservoir is admitted from the supply pipe 62 through the valve to emergency brake pipe 64 and thence to the operating cylinder 10 for the braking apparatus 1, whereby the vehicle brakes are automatically applied whenever pressure on the pedal 30 is released.

Moreover, the unlocking of the manually-controlled doors is maintained by means of the emergency valve 5 as long as the emergency brake application is made, since air pressure in the pipe 57 is not again available, to cause the sliding block 52 in the emergency valve to assume its upper position, until the emergency brake application has been released.

I do not wish to be restricted to the specific structural details or arrangement of parts herein set forth, as various modifications thereof may be effected within the spirit and scope of my invention. I desire, therefore, that only such limitations shall be imposed thereon as are indicated in the appended claims.

I claim as my invention:

1. In a vehicle, the combination with a door-operating device and vehicle-braking apparatus, of means for manually effecting movement of said device in the one or the other direction, movement in one direction being permitted only when said braking apparatus is in a certain condition irrespective of the actuation of said manual means.

2. In a vehicle, the combination with a door-operating device and vehicle-braking apparatus, of means for manually governing movement of said device to the open or the closed position, movement to the open position being prevented except when said braking apparatus is in an "applied" condition irrespective of the position of said manual means.

3. In a vehicle, the combination with a fluid-pressure-operated door-engine and a pneumatic brake apparatus, of a manually-operated valve for effecting movement of said engine in the one or the other direction, the admission of fluid pressure through said valve to effect such movement in one direction being prevented unless said brake apparatus is in a certain condition.

4. In a vehicle, the combination with a fluid-pressure-operated door-engine and a pneumatic brake apparatus, of a manually-operated valve for governing movement of said engine to the open or the closed position, the admission of fluid pressure through said valve to effect such movement to the open position being permitted only when said brake apparatus is in an "applied" condition.

5. In a vehicle, the combination with a door-operating device and vehicle-braking apparatus, of means for manually effecting movement of said device in the one or the other direction, and a primary controlling device for the vehicle, movement in one direction being permitted only when said primary controlling device occupies a certain position corresponding to a predetermined condition of said braking apparatus.

6. In a vehicle, the combination with a door-operating device and vehicle-braking apparatus, of means for manually governing movement of said device to the closed or the open position, and a primary controlling device for the vehicle, movement to the open position being prevented except when said primary controlling device occupies a position corresponding to application of said braking apparatus.

7. In a vehicle, the combination with a fluid-pressure-operated door-engine and a pneumatic brake apparatus, of a manually-operated valve for effecting movement of said engine in the one or the other direction, and a primary controlling device for the vehicle, the admission of fluid pressure through said valve to effect such movement in one direction being prevented unless said primary controlling device occupies a certain position corresponding to a predetermined condition of said braking apparatus.

8. In a vehicle, the combination with a fluid-pressure-operated door-engine and a pneumatic brake apparatus, of a manually-operated valve for governing movement of said engine to the open or the closed position, and a primary controlling device for the vehicle, the admission of fluid pressure through said valve to effect such movement to the open position being permitted only in a certain position of said primary controlling device corresponding to application of said braking apparatus.

9. In a vehicle, the combination with a door-operating device and vehicle-braking apparatus, of means for manually effecting movement of said device in the one or the other direction, and a foot-operated controlling device for the vehicle, movement in one direction being permitted only when said foot-operated controlling device occupies a certain position corresponding to a predetermined condition of said braking apparatus.

10. In a vehicle, the combination with a door-operating device and vehicle-braking apparatus, of means for manually governing movement of said device to the closed or the open position, and a foot-operated controlling device for the vehicle, movement to the open position being prevented except when said foot-operated controlling device occupies a position corresponding to application of said braking apparatus.

11. In a vehicle, the combination with a fluid-pressure-operated door-engine and a pneumatic brake apparatus, of a manually-operated valve for effecting movement of said engine in the one or the other direction, and a foot-operated controlling device for the vehicle, the admission of fluid pressure through said valve to effect such movement in one direction being prevented unless said foot-operated controlling device occupies a certain position corresponding to a predetermined condition of said braking apparatus.

12. In a vehicle, the combination with a fluid-pressure-operated door-engine and a pneumatic brake apparatus, of a manually-operated valve for governing movement of said engine to the open or the closed position, and a foot-operated controlling device for the vehicle, the admission of fluid-pressure through said valve to effect such movement to the open position being permitted only in a certain position of said foot-operated controlling device corresponding to application of said braking apparatus.

13. In a vehicle, the combination with a fluid-pressure operated door-engine and a pneumatic braking apparatus, of means responsive to pressure conditions in said apparatus for preventing the maintenance of door-closing conditions in said door-engine under application conditions of said braking apparatus.

14. In a vehicle, the combination with a fluid-pressure-operated door-engine and a pneumatic braking apparatus including a brake cylinder, of means responsive to fluid-pressure conditions in said cylinder for permitting the opening movement of said door-engine under application conditions of said braking apparatus.

15. In a vehicle, the combination with a fluid-pressure-operated door-engine and a pneumatic braking apparatus, of manual means for effecting movement of said door-engine in the one or the other direction, and means responsive to fluid-pressure conditions in said apparatus for preventing the maintenance of door-closing conditions in said door-engine when said manual means occupies a predetermined position.

16. In a vehicle, the combination with a fluid-pressure-operated door-engine and a pneumatic braking apparatus including a brake cylinder, of a manually-operated valve for governing movement of said door-engine to the open or the closed position, and a valve responsive to fluid-pressure conditions in said cylinder for permitting the opening movement of said door-engine when said manually-operated valve occupies its closing position.

17. In a vehicle, the combination with a fluid-pressure-operated door-engine and a pneumatic brake apparatus, of a manually-operated valve for governing the movement of said engine, a first valve device for normally conveying fluid pressure to said manually-operated valve, and a second valve device for normally admitting fluid pressure to said first valve device and for admitting fluid pressure to said brake apparatus under abnormal conditions.

18. In a vehicle, the combination with a fluid-pressure-operated door-engine and a pneumatic brake apparatus, of a manually-operated valve for governing the movement of said engine, a first valve device for normally conveying fluid pressure to said manually-operated valve and having another position corresponding to exhaust from the closing side of said door-engine, a second valve device for normally admitting fluid pressure to said first valve device, and a primary controlling device biased to actuate said second device to a position admitting fluid pressure to said brake apparatus.

19. In a vehicle, the combination with a fluid-pressure-operated door-engine and a pneumatic brake apparatus, of a manually-operated valve for governing the movement of said engine, a first valve device for normally conveying fluid pressure to said manually-operated valve and having another position corresponding to exhaust from the closing side of said door-engine, a second valve device for normally admitting fluid pressure to said first valve device, and a foot-operated controlling device biased to actuate said second device to a position admitting fluid pressure to said brake apparatus and to further admit fluid pressure to said manually-operated valve to allow opening movement of the door-engine.

In testimony whereof, I have hereunto subscribed my name this 2nd day of July, 1920.

KARL A. SIMMON.